United States Patent
Claiborne et al.

(10) Patent No.: US 6,172,682 B1
(45) Date of Patent: *Jan. 9, 2001

(54) DETECTING INSIDENESS OF A RECTANGLE TO AN ARBITRARY POLYGON

(75) Inventors: Steven J. Claiborne, Boise; Jeff H. Papke, Meridian, both of ID (US)

(73) Assignee: Hewlett-Packard Co., Palo Alto, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/590,658

(22) Filed: Jan. 24, 1996

(51) Int. Cl.[7] .............................. G06T 11/20; G06T 15/30

(52) U.S. Cl. ........................................... 345/441; 345/434

(58) Field of Search .................................... 382/203, 204, 382/206, 286, 291; 345/434, 433, 427, 421–423, 419, 139, 136, 118, 420, 441

(56) References Cited

U.S. PATENT DOCUMENTS

| | | | |
|---|---|---|---|
| 4,897,805 | * 1/1990 | Wang | 395/129 |
| 4,972,330 | * 11/1990 | Matsuhiro et al. | 395/134 |
| 5,040,130 | * 8/1991 | Chang et al. | 395/134 |
| 5,051,737 | * 9/1991 | Akeley et al. | 395/134 |
| 5,347,619 | * 9/1994 | Erb | 395/126 |
| 5,428,716 | * 6/1995 | Brokenshire et al. | 395/121 |
| 5,455,897 | * 10/1995 | Nicholl et al. | 395/134 |
| 5,572,634 | * 11/1996 | Duluk, Jr. | 395/119 |
| 5,574,835 | * 11/1996 | Duluk, Jr. et al. | 395/121 |
| 5,579,455 | * 11/1996 | Greene et al. | 395/122 |
| 5,583,975 | * 12/1996 | Naka et al. | 395/126 |
| 5,613,052 | * 3/1997 | Narayanaswami | 395/134 |
| 5,710,578 | * 1/1998 | Beauregard et al. | 345/429 |
| 5,757,321 | * 5/1998 | Billyard | 345/434 |

OTHER PUBLICATIONS

Computer Graphics: Principles and Practice, by Foley et al., pp. 925–945, 1996, reprinted in Jul. 1995.*

Liang et al., "An Analysis and Algorithm for Polygon Clipping", ACM vol. 26, No. 11, No. 1983.*

* cited by examiner

Primary Examiner—Amelia Au
Assistant Examiner—Martin Miller
(74) Attorney, Agent, or Firm—Anthony J Baca

(57) ABSTRACT

There is described a method for determining the relative location between a rectangle and a polygon. First, a box that bounds the polygon is created. An outside indicator is returned if the rectangle is outside the box. An intersect indicator is returned if the box is entirely inside the rectangle. If an odd/even fill process is in use then first the intersect indicator is returned if the rectangle intersects with the polygon or if a subpath bounding box is entirely inside the rectangle. Finally, if the location of the rectangle has not yet been returned, the location of a single point of the rectangle is returned. If a non-zero winding fill process is in use, first, the intersect indicator is returned if at least one corner of the rectangle is in a different side of the polygon than remaining corners of the rectangle. Next, the intersect indictor is returned if an edge of the rectangle starts outside the polygon and intersects with the polygon or if an edge of the rectangle intersects with the polygon and transitions outside the polygon. A subpath bounding box that bounds any subpaths is created. The location of a corner of the rectangle is returned if a point inside the subpath is equal to the corner of the rectangle. In the alternative, where the corner and subpath's points are different, the intersect indicator is returned. Finally, if the location of the rectangle has not yet been returned, the location of a center point of the rectangle is returned.

10 Claims, 5 Drawing Sheets

DETECTING INSIDENESS OF A RECTANGLE TO AN ARBITRARY POLYGON

TECHNICAL FIELD

This invention relates to a method for processing image data and more particularly, to a method to determine if a rectangle is inside, outside, or intersects, a polygon.

BACKGROUND OF THE INVENTION

Clipping is the process of modifying a subject figure by retaining the part disposed inside the given clip boundary and removing the part disposed outside the clip boundary. The subject figure may be a graphic image or a primitive element thereof, such as a line, polygon, circle, raster image or bitmapped character. The clip boundary is a polygon ranging from a simple rectangle to any arbitrary shape. Clipping is extensively employed in computer graphics and image processing, in computer operating systems that display windows, and in printers such as laser printers.

There are two well-known polygon clipping algorithms, the Sutherland-Hodgman and the Liang-Barsky algorithms (See Ivan E. Sutherland and Gary W. Hodgroan, Reentrant polygon clipping, Communications of the ACM, volume 17 (1974), no. 1, page 32–42 and You-Dong Liang and Brian A. Barsky, An analysis and algorithm for polygon clipping Communications of the ACM, volume 26 (1983), no. 11 page 868–877). They will be discussed briefly in this section.

The Sutherland-Hodgman algorithm clips the polygon through a pipeline with a different boundary line in each stage of the pipeline. Suppose the boundary lines are ordered in this manner: the left, right, bottom and then the top boundary lines. The algorithm first clips the polygon against the left boundary line. The result of this stage is then fed to be clipped against the right boundary line in the second stage. Similarly, the results of the second, and the third stages are fed to be clipped against the bottom and top boundary lines respectively. The resultant polygon of the fourth stage is the resultant polygon of the clipping process.

In each stage, each of the edges of the input polygon is handled separately into four cases.

1) Both endpoints are inside the boundary line. The second endpoint is sent to the outside
2) Both endpoints are outside the boundary line. Both are discarded.
3) The first endpoint is inside the boundary line and the second endpoint is outside the boundary line. Compute the intersection point the edge makes with the boundary line and output it.
4) The first endpoint is outside the boundary line and the second endpoint is inside the boundary line. Compute the intersection point the edge makes with the boundary line, output it, and then output the second endpoint.

The Liang-Barsky algorithm also handles each edge separately. Each edge is parameterized and clipped against the window. When processing an edge, the edge is extended to infinity at both ends. There are two cases.

1) The extended edge originates from a corner region; intersects a boundary line to enter an edge region; intersects another boundary line to enter the window; intersects a boundary line to exit to an edge region; and finally intersects the last boundary line to enter a corner region. If the edge overlaps the first portion of the extended edge, then output the corner of the corner region it originates from. If the edge overlaps the portion of the extended edge that enters the window, then compute the intersection point and output it. If the first endpoint of the edge is inside the window, output it. If the second endpoint of the edge is inside the window, output it as well. If the edge overlaps the portion of the extended edge that exits the window, compute the intersection point on the window boundary and output the intersection point.

2) The extended edge originates from a corner region; intersects a boundary line to enter an edge region; intersects another boundary line to enter another corner region on the same invisible side as the originating corner region; intersects a boundary line to enter an edge region; and finally intersects a boundary line to enter another corner region. If the edge overlaps the first portion of the extended edge, then output the corner of the originating corner region. If the edge overlaps the portion of the extended edge that exits the second corner region, then the corner of that corner region is also sent to the output.

One problem with the prior art clipping algorithms is their unsatisfactory performance in handling irregular polygon clip boundaries. To increase the performance of any clipping algorithm, a first pass should determine if a clipping algorithm needs to be used at all. For example, if the subject figure is entirely inside or outside the clip boundary no clipping is necessary. Only if the subject figure intersects with the clip boundary is the complicated clipping algorithm needed. Therefore, a quick "insideness" test can determine if the clipping algorithm needs to be used.

There are known methods that test whether a point lies inside a polygon. By definition, filling the polygon causes all points inside to be painted. Thus, known insideness methods use a filling algorithm.

Generally, all of the filling algorithms disclosed in the prior art are based on defining the interior of a polygon by a winding number. The winding number for a point is the number of times that point is circled in tracing the polygon boundary. There are two well known winding number methods: odd/even and non-zero.

Under the odd/even winding approach, defining a point as interior if an odd number of boundaries are crossed to reach it is equivalent to defining interior points as having an odd winding number. The non-zero winding number involves giving each edge a direction number −1 or +1, based on whether one moves up or down along the edge as one traces the polygon boundary counter-clockwise. As one steps along a scan line and notes intersections with the boundary, the direction numbers of the edges crossed are added.

For a simple path, it is intuitively clear what region lies "inside." However, for a more complex path—for example, a path that intersects itself or has one or more subpaths that enclose another—the interpretation of "inside" is not so obvious.

The non-zero winding number rule determines whether a given point is inside a path by conceptually drawing a ray from that point to infinity in any direction and then examining the places where a segment of the path crosses the ray. Here's how it works:

Starting with a count of zero, add one each time a path segment crosses the ray from left to right and subtract one each time a path segment crosses the ray from right to left. After counting all the crossings, if the result is zero then the point is outside the path. Otherwise it is inside.

Note, the rule does not specify what to do if a path segment coincides with or is tangent to the ray. Since any ray will do, one may simply choose a different ray that does not encounter such problem intersections.

With the non-zero winding number rule, a simple convex path yields inside and outside as you would expect. Now consider a five-pointed star, drawn with five connected straight line segments intersecting each other as shown in FIG. 1A. The entire area enclosed by the star, including the pentagon in the center, is considered inside by the non-zero winding number rule. For a path composed of two concentric circles, if they are both drawn in the same direction as in FIG. 1B, the areas enclosed by both circles are inside, according to the rule. If they are drawn in opposite directions as in FIG. 1C, only the "doughnut" shape between the two circles is inside, according to the rule; the "doughnut hole" is outside.

An alternative to the non-zero winding number rule is the even-odd rule. This rule determines the "insideness" of a point by drawing a ray from that point in any direction and counting the number of path segments that the ray crosses. If this number is odd, the point is inside; if even, the point is outside.

The even-odd rule yields the same results as the non-zero winding number rule for paths with simple shapes, but yields different results for more complex shapes. For the five-pointed star drawn with five intersecting lines, the even-odd rule considers the triangular points to be inside, but the pentagon in the center to be outside. See FIG. 1D. For the two concentric circles as shown in FIG. 1E, only the "doughnut" shape between the two circles is inside, according to the even-odd rule, regardless of whether the circles are drawn in the same or opposite directions.

SUMMARY OF THE INVENTION

To accomplish the objective of the present invention there is provided a method for determining the relative location between a rectangle and a polygon. First, a box that bounds the polygon is created. An outside indicator is returned if the rectangle is outside the box. An intersect indicator is returned if the box is entirely inside the rectangle. Processing branches based on the type of fill process in use.

If an odd/even fill process is in use then first the intersect indicator is returned if the rectangle intersects with the polygon. For any subpaths present within the polygon, a subpath bounding box that bounds the subpath is defined. The intersect indicator is returned if the subpath bounding box is entirely inside the rectangle. Finally, if the location of the rectangle has not yet been returned, the location of a single point of the rectangle is returned.

In the alternative where a non-zero winding fill process is in use, the intersect indicator is returned if at least one corner of the rectangle is in a different side of the polygon than remaining corners of the rectangle. Next, the intersect indictor is returned if an edge of the rectangle starts outside the polygon and intersects with the polygon. Continuing, the intersect indicator is returned if an edge of the rectangle intersects with the polygon and transitions outside the polygon. For any subpaths present within the polygon, a subpath bounding box that bounds the subpath is created. The location of a corner of the rectangle is returned if a point inside the subpath is equal to the corner of the rectangle. In the alternative, where the corner and subpath's points are different, the intersect indicator is returned. Finally, if the location of the rectangle has not yet been returned, the location of a center point of the rectangle is returned.

BRIEF DESCRIPTION OF THE DRAWINGS

A better understanding of the invention may be had from the consideration of the following detailed description taken in conjunction with the accompanying drawings in which.

DETAILED DESCRIPTION OF THE PREFERRED EMBODIMENTS

The present invention is not limited to a specific embodiment illustrated herein. In the preferred embodiment of the present invention, an arbitrary clippath and a rectangular object are compared. The result indicates whether the rectangle is inside, outside, or intersects with the clippath. The rectangular object may be positioned in an infinite number of locations relative to a clippath. Numerous of those locations are shown in the FIG. 2. Some locations, such as rectangle 203, 215, and 211, require clipping against clippath 200A and 200B (herein referred to as clippath 200 collectively). However, several other locations, such as 202, 204, 205 and 209, require no clipping. The present invention quickly identifies those locations which do not require clipping.

Figure 3:
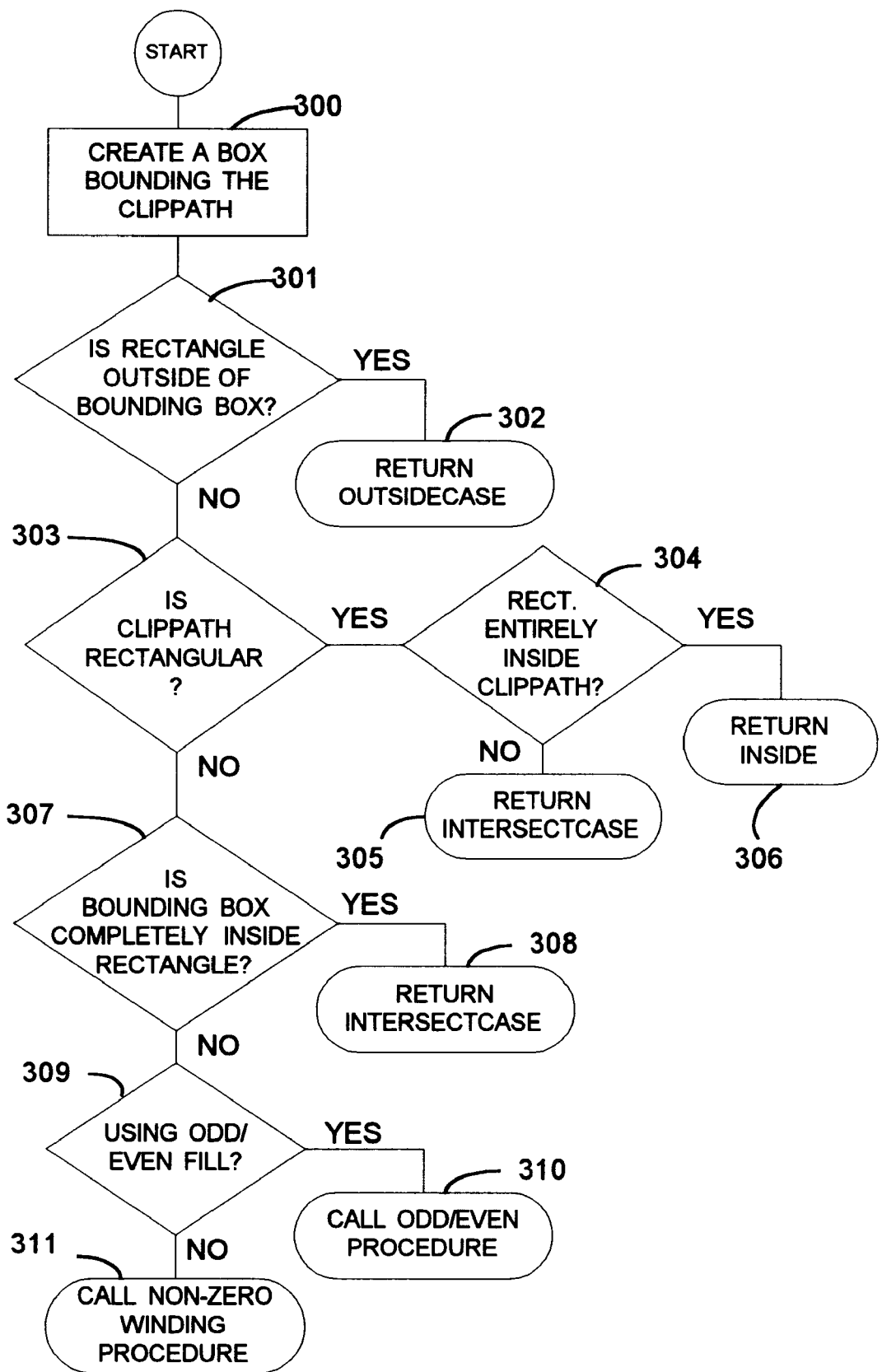
FIG. 3 is a logical flow diagram in accordance with the present invention.

Referring now to FIG. 3 where the overall flowchart of the preferred embodiment of the present invention is shown. First, the clippath is bounded by a box having a height equal to the maximum height of the clippath and a width equal to the maximum width of the clippath 300. By bounding the clippath in a box, the initial determination on whether a rectangle is within the clippath can be done using rectangular objects. One skilled in the art understands that using rectangular objects is more computationally efficient.

Next, a check, 301, is performed to determine whether the rectangle is completely outside of the bounding box. Boxes completely outside of the bounding box cannot intersect or be within the clippath. Therefore, an "OUTSIDECASE" is returned 302. Assuming a rectangle is not completely outside of the bounding box, it is next determined whether the clippath itself is rectangular 303. Assuming for now, that the clippath is rectangular, then the bounding box created at 300, exactly matches the clippath. Having already discarded the case for a rectangle being completely outside of the bounding box, a check 304 determines whether the rectangle is entirely inside the clipping path. This determination has two possible outcomes. If the rectangle is entirely inside the clippath then "INSIDE" is returned 306. In the alternative where the rectangle is not entirely inside the clippath, then it has intersected with the clippath. For these rectangles an "INTERSECTCASE" is returned 305.

For those clippaths which are not rectangular, a check, 307, is made to determine if the bounding box surrounding the clippath is completely inside the rectangle. If the bounding box is completely inside the rectangle, then it has by definition intersected with the clippath. Thus, an "INTERSECTCASE" is returned 308.

Figure 4:
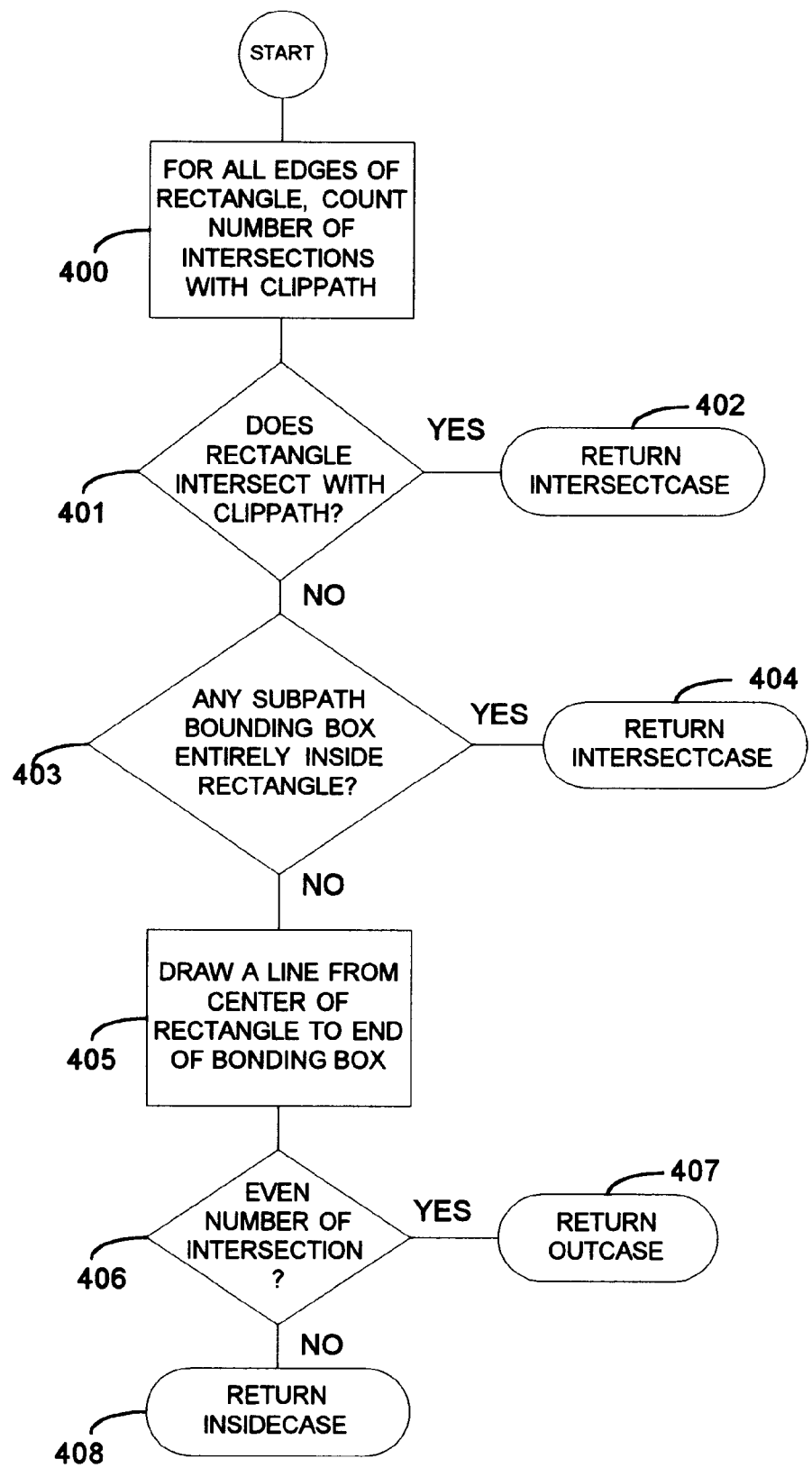
FIG. 4 is a logical flow diagram used when odd/even fill procedure is being used.
Figure 5:
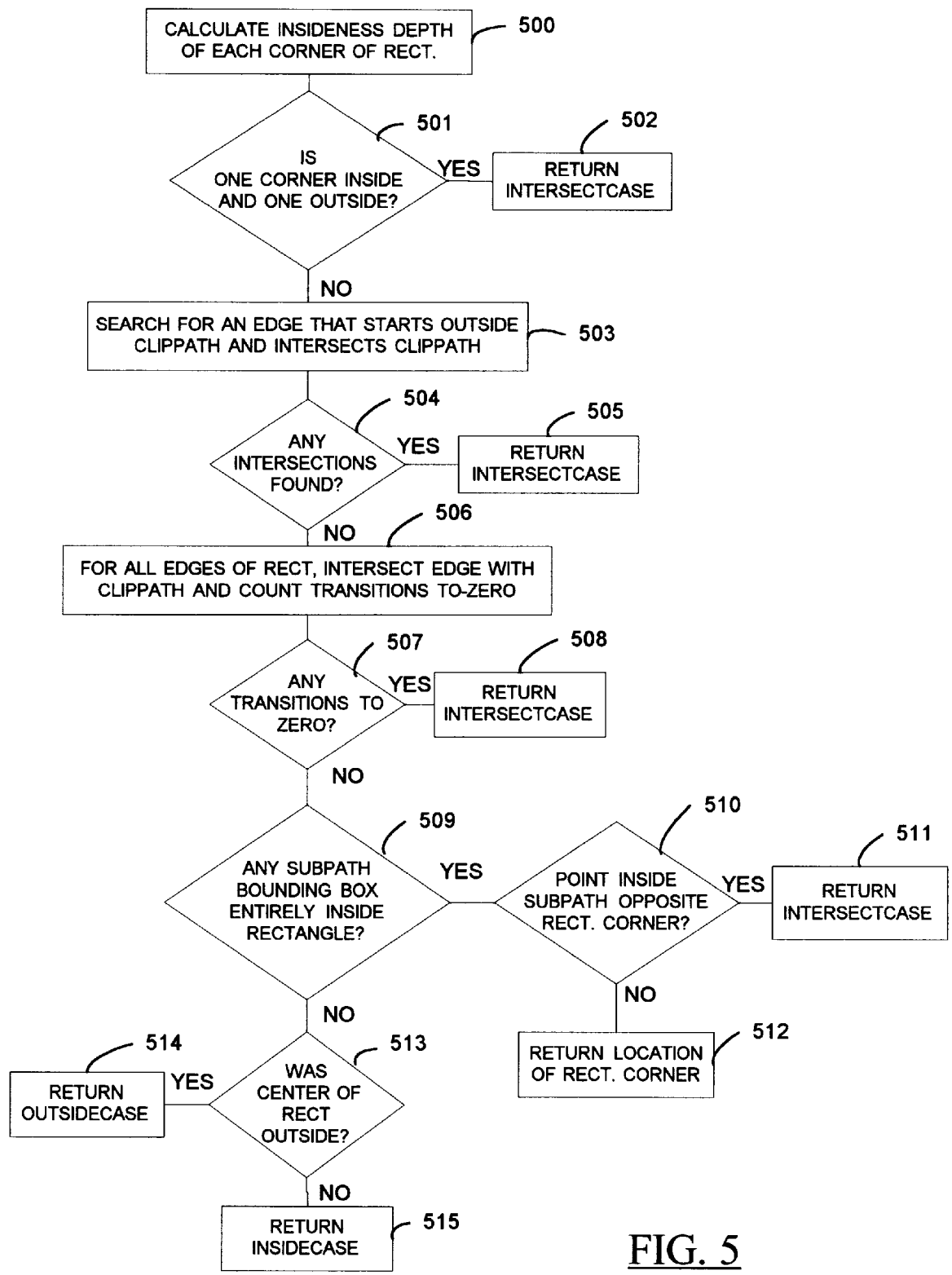
FIG. 5 is a logical flow diagram used when non-zero winding fill procedure is being used.

With all the trivial cases resolved, process must continue to determine the location of the rectangle relative to the clippath. However, as stated above, the interior of a complicated clippath may change from inside to outside depending upon the fill procedure presently in use. Thus, at 309, the procedure branches based upon the fill procedure currently in use. For those instances where the "odd/even" fill procedure is being used, the flow chart of FIG. 4 is executed. Alternatively, when the "non-zero winding" procedure is in use, the flow chart of FIG. 5 is executed.

Referring now to FIG. 4, the procedure used for odd/even fill mode will be described. First, each edge of the rectangle is checked, 400, to determine if it intersects with the clippath. If any edge of the rectangle intersects with the clippath, 401, then an "INTERSECTCASE" is returned 402. Next, at 403, a check is made to determine whether a subpath bounding box is entirely inside the rectangle. Such a phenomena would occur if the clippath has a subclippath thereby creating a doughnut effect. For those cases where a subpath is completely inside the rectangle the procedure returns "INTERSECTCASE" 404.

Having made it this far, the only remaining rectangle must either be entirely inside or entirely outside of the clippath. To determine the location of the rectangle, the preferred embodiment of the present invention draws a line from the center of the rectangle to just past the edge of the bounding box 405. With the line drawn, the number of times that the line intersects with the clippath is counted. Finally, it is determined 406 whether the number of intersects is even or odd. An even number of intersects indicates that the rectangle is outside of a clippath 407, while an odd number of intersections indicates that the rectangle is completely inside the clippath 408.

The non-zero winding procedure requires a slightly more complicated procedure to determine the insideness of the rectangle. A flow diagram showing the preferred embodiment is shown in FIG. 5. First, the "insideness depth" of each corner of the rectangle is determined 500. This determination is made by drawing a vector from the appropriate corner to just past the edge of the bounding box. The number of intersections with the clippath is tabulated, taking into account the direction that the clippath is traveling relative to the vector. If one corner of the rectangle is outside of the clippath and one corner inside, 501, then the rectangle intersects with the clippath. Thus, the procedure returns "INTERSECTCASE" 502.

Next, each edge of the rectangle is checked to find an edge which has a starting point outside of the clippath but intersects with the clippath 503. If any of the edges of the rectangle meet the above criteria 504, then the procedure returns "INTERSECTCASE" 505.

Continuing with FIG. 5, each edge of the rectangle that intersects the clippath, is checked to see if the edge transitions to zero 506. If any edge of the rectangle does transition to zero 507, then it has intersected with the clippath. As such, the procedure returns "INTERSECTCASE" 508. Next, at 509, a check is made to determine whether a subpath bounding box is entirely inside the rectangle. Assuming for now that the clippath contains subpaths, a point inside the subpath is compared to a corner of the rectangle 510. If the points are both inside or outside, then the location of the rectangle is returned 512. However, if the points are different, then the rectangle intersects with the subpath causing the return of "INTERSECTCASE" 511.

Finally, if no subpaths are present, the procedure simply determines whether the center of the rectangle is inside or outside of the clippath 513. The appropriate indicator is returned based upon the location of the center of the rectangle 514, 515.

Figure 1A:
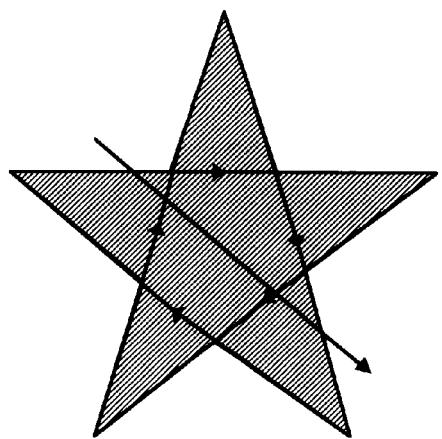
FIG. 1 provides various geometric shapes used to describe two fill methods.
Figure 1B:
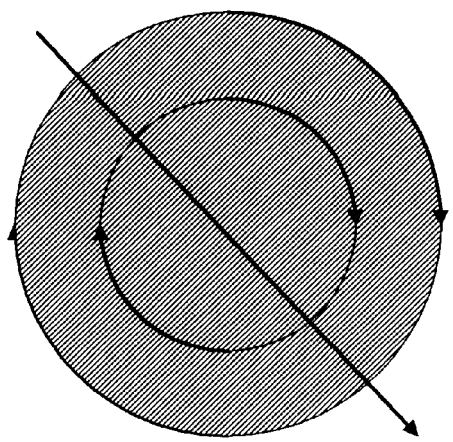
Figure 1C:
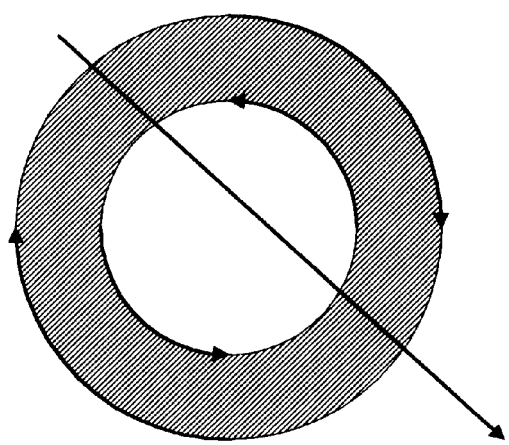
Figure 1D:
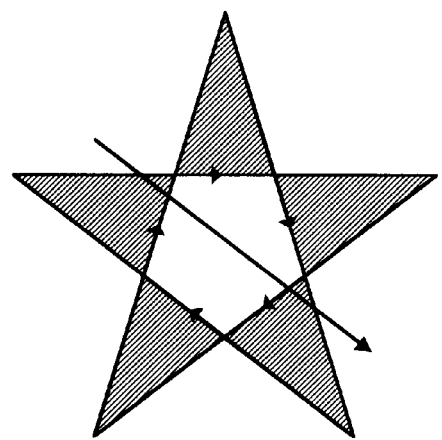
Figure 1E:
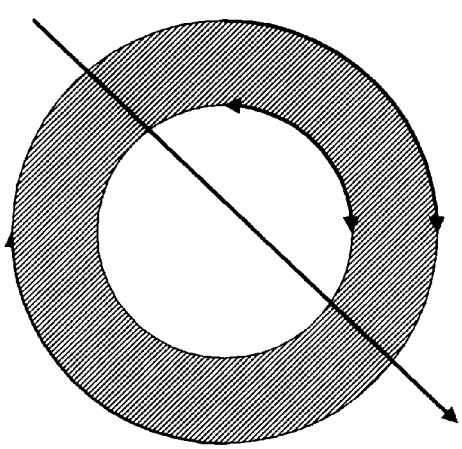
Figure 2:
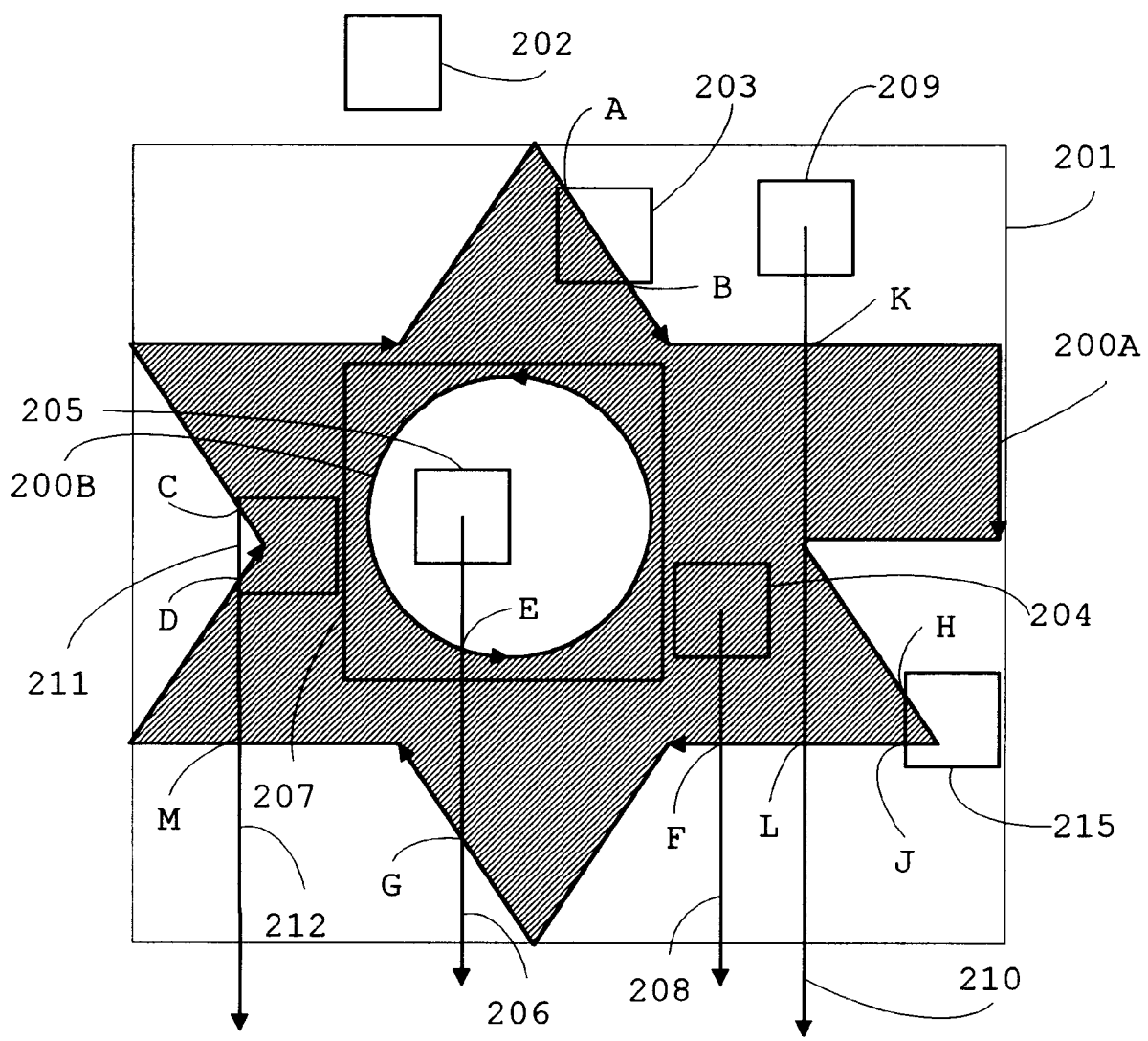
FIG. 2 shows several possible locations of the rectangle in relation to the arbitrary clippath.

With that overview of the preferred embodiment of the present invention, an example shown in FIG. 2 will be processed through the entire procedure. Note, FIG. 2 is a composite of numerous rectangles In actual operation, a single rectangle is processed. Referring now to FIG. 3 with the aid of FIG. 2, first in FIG. 3 a box 201 bounding clippath 200 is created 300. Next, a check in 301 is made to determine whether the rectangle is completely outside of the bounding box 201. Box 202 in FIG. 2 satisfies this condition and would require the procedure of FIG. 3 to return "OUTSIDECASE" 302. Next, in 303 a check is made to determine if clippath 200A is rectangular. In FIG. 2 clearly shows that clippath 200 is not rectangular. Next, it is determined 307 if the bounding box 201 is completely inside the rectangle. No such rectangle meets this criteria in FIG. 2.

Processing must now branch depending upon the fill procedure currently in use. First the flow chart of FIG. 4, which correlates to odd/even procedure, will be described followed by FIG. 5, which corresponds to non-zero winding procedure. Referring now to FIG. 4, in box 400 each edge of the rectangle is processed and a count relating to the number of intersections with the clippath 200 is maintained. In 401, a check is made to determine if the rectangle intersects with the clippath 200. Boxes 203, 215, and 211 of FIG. 2 cause the procedure to return "INTERSECTCASE" 402. Next, any subpaths which are entirely inside a rectangle will also cause the return of "INTERSECTCASE". A subpath is defined as a path within the interior region as defined by clippath 200A. The FIG. 2 contains one subpath namely 200B. Thus, rectangle 207 satisfies this condition and causes the procedure to return "INTERSECTCASE" 404.

Next, a line is drawn from the center of the rectangle to the end of the bounding box and the number of intersections with a clippath are counted. Boxes containing an even number of intersections are considered to be outside. For example, box 209 in FIG. 2 shows line 210 emanating from its center. Line 210 intersects with clippath 200 at point K and L, thus indicating an even number of intersections. Box 205 shown with line 206 drawn from the center indicates and even number of intersections, at point E and G. Thus, both boxes 209 and 205 are considered outside of clippath 200. Box 204 with line 208 drawn from its center intersects with clippath 200 at point F. Therefore, box 204 is completely inside clippath 200.

Referring now to FIG. 5, the various locations of rectangles within FIG. 2 will be processed through this flow chart. First, the insideness depth of each corner of the rectangle is calculated 500. Next, determine 501 whether a rectangle has all of its corners inside or all of its corners outside of the clippath. If a rectangle does not have all of its corners either inside or outside of the clippath, there must be some intersection between the rectangle and the clippath. Box 203 is exemplary of an intersection condition.

Next, a search, 503, is made for an edge which starts outside of the clippath but intersects with the clippath. If any edge is found which starts outside of the clippath yet intersects with the clippath, the procedure will return "INTERSECTCASE" 505 for that box. Referring to box 215 in FIG. 2, shows that box 215 has all four corners outside of clippath 200. However, box 215 intersects with clippath 200 at points H and J. Therefore, box 215 causes the procedure of FIG. 5 to return "INTERSECTCASE" 505.

For each edge of the rectangle that intersects with the clippath, a count is calculated to determine whether the edge transitions to zero 506. If a rectangle contains an edge which transitions to zero 507, then the procedure returns "INTERSECTCASE". Box 211 of FIG. 2 may be used to explain this test. All four corners of box 211 reside within clippath 200. However, rectangle 211 intersects with clippath 200 at points C and D. Without further processing, it is impossible to determine whether intersections at points C and D cause rectangle 211 to exit the boundary of clippath 200. By testing each point of intersection for its insideness, a determination can be made whether the intersection point transitioned from the inside to the outside of clippath 200. Determination of insideness of a given point is determined by drawing a line from the exterior of bounding box 201 to the point of intersection. Thus, for example, line 212 is drawn up to point D. Initially, line 212 assumes a value of zero. As line 212 intersects at point M line 212 now has a value of plus 1. Line 212 returns to zero at point D. Because line 212 transitioned to zero at point D, this indicates that point D is outside of clippath 200. Therefore, box 211 causes the procedure of FIG. 5 to return "INTERSECTCASE" 508.

Next, any subpaths which are entirely inside a rectangle may also cause the return of "INTERSECTCASE". A subpath is defined as a path within the interior region as defined by clippath 200. FIG. 2 contains one subpath namely 200B. However, unlike the odd/even procedure of FIG. 4, the inside of a subpath may be considered inside or outside. To determine whether the rectangle and subpath intersect, a point inside the subpath is compared to a corner of the rectangle 510. If one point is inside and the other is outside, then there is an intersection 511. However, if both points are the same, i.e., both inside or both outside, then the procedure returns their location 512. Rectangle 207 completely surrounds subpath 200B. Testing the two points reveals that the corner of rectangle 207 is inside while the inside of subpath 200B is outside. Thus, rectangle 207 intersects with clippath 200 and causes the procedure to return "INTERSECTCASE" 511.

Any rectangle still undetected, is either entirely inside of clippath 200 or outside of clippath 200. Therefore, one may simply determine any point in the box and therein know the location of the entire box. Thus, box 205 and box 209 are considered outside of clippath 200 whereas box 204 is considered inside.

Although the preferred embodiment of the invention has been illustrated, and that form described, it is readily apparent to those skilled in the art that various modifications may be made therein without departing from the spirit of the invention or from the scope of the appended claims.

What is claimed is:

1. A method for determining relative location between a rectangle and a polygon, dependent on use of a first fill process or a second fill process, said method comprising the steps of:
    creating a box that bounds said polygon;
    the rectangle being outside of the polygon if said rectangle is outside of said box;
    the rectangle intersecting with the polygon if said box is entirely inside said rectangle;
    detecting whether the first fill process or the second fill process is in use;
    if said first fill process is in use then:
        a) the rectangle intersecting with the polygon if said rectangle intersects with said polygon;
        b) for any first subpath present within said polygon, defining a first subpath bounding box that bounds said first subpath;
        c) the rectangle intersecting with the polygon if said first subpath bounding box is entirely inside said rectangle;
        d) determining a location of a single point of said rectangle, the rectangle have the same location relative to the polygon as the single point;
    in the alternative where said second fill process is in use, then:
        i) the rectangle intersecting with the polygon if at least one corner of said rectangle is in a different side of said polygon than remaining corners of said rectangle;
        ii) the rectangle intersecting with the polygon if an edge of said rectangle starts outside of said polygon and intersects with said polygon;
        iii) the rectangle intersecting with the polygon if an edge of said rectangle intersects with said polygon and transitions outside of said polygon;
        iv) for any second subpath present within said polygon, defining a second subpath bounding box that bounds said second subpath;
        v) the rectangle have the same location relative to the polygon as a location of a corner of said rectangle if a point inside said second subpath is equal to said corner of said rectangle, in the alternative, the rectangle intersecting with the polygon, and
        vi) determining a location of a center point of said rectangle, the rectangle have the same location relative to the polygon as the center point.

2. The method of claim 1 further comprising the steps of:
    if said box and said polygon are equal, the rectangle intersecting with the polygon if said rectangle intersects with said box, in the alternative, the rectangle being inside the polygon if said rectangle is entirely inside said box.

3. The method of claim 1 said step of d) determining a location of a single point of said rectangle comprising the steps of:
    initializing a counter to zero;
    drawing a line from the center of said rectangle to said box;
    incrementing said counter for each intersection between said line and said polygon;
    the rectangle being inside the polygon if said counter results in an even number; and
    the rectangle being outside the polygon if said counter results in an odd number.

4. The method of claim 1 said step of vi) determining a location of a center point of said rectangle comprising the steps of:
    initializing a counter to zero;
    drawing a line from the center of said rectangle to said box;
    incrementing said counter for each intersection in a first direction between said line and said polygon and decrementing said counter for each intersection in a second direction between said line and said polygon;
    the rectangle being inside the polygon if said counter results in a non-zero number; and
    the rectangle being outside the polygon if said counter results in a zero number.

5. The method of claim 1 said step of i) the rectangle intersecting with the polygon comprising the steps of:
    calculating an insideness depth for each corner of said rectangle;
    for each corner, determining if said corner is inside or outside said polygon; and
    comparing all four corner of said rectangle to determine if at least one corner of said rectangle is in a different side of said polygon than remaining corners of said rectangle.

6. A method for determining relative location between a rectangle and a polygon, said method comprising the steps of:

creating a box that bounds said polygon;

the rectangle being outside the polygon if said rectangle is outside of said box;

determining if said box and said polygon are equal;

if said box and said polygon are equal, the rectangle intersecting with the polygon if said rectangle intersects with said box, in the alternative, the rectangle being inside the polygon if said rectangle is entirely inside said box, and if said box and said polygon are unequal, then I) the rectangle intersecting with the polygon if said rectangle intersects with said polygon, II) the rectangle being outside the polygon if said rectangle is outside of said polygon; and III) dependent on a fill process is in use, determining the relative location of the rectangle.

7. The method of claim 6 said step of determining the location of the rectangle comprising the steps of:

where a first fill process is in use then:

a) for any first subpath present within said polygon, defining a first subpath bounding box that bounds said first subpath;

b) the rectangle intersecting with the polygon if said first subpath bounding box is entirely inside said rectangle;

c) determining a location of a single point of said rectangle, the rectangle have the same location relative to the polygon as the single point;

in the alternative where a second fill process is in use, then:

i) for any second subpath present within said polygon, defining a second subpath bounding box that bounds said second subpath;

ii) determining a location of a corner of said rectangle if a point inside said second subpath is equal to a corner of said rectangle, in the alternative, the rectangle intersecting with the polygon, and iii) determining a location of a center point of said rectangle, the rectangle have the same location relative to the polygon as the center point.

8. The method of claim 7 said step of determining a location of a single point comprising the steps of:

initializing a counter to zero;

drawing a line from the center of said rectangle to said box;

incrementing said counter for each intersection between said line and said polygon;

the rectangle being inside the polygon if said counter results in an even number; and the rectangle being outside the polygon if said counter results in an odd number.

9. The method of claim 7 said step of determining a location of a center point of said rectangle comprising the steps of:

initializing a counter to zero;

drawing a line from the center of said rectangle to said box;

incrementing said counter for each intersection in a first direction between said line and said polygon and decrementing said counter for each intersection in a second direction between said line and said polygon;

the rectangle being inside the polygon if said counter results in a non-zero number; and the rectangle being outside the polygon if said counter results in a zero number.

10. The method of claim 6 said step of if said box and said polygon are unequal, then the rectangle intersecting with the polygon comprising the steps of:

calculating an insideness depth for each corner of said rectangle;

for each corner, determining if said corner is inside or outside said polygon; and comparing all four corner of said rectangle to determine if at least one corner of said rectangle is in a different side of said polygon than remaining corners of said rectangle.

* * * * *